United States Patent [19]

Brown et al.

[11] Patent Number: 5,002,479
[45] Date of Patent: Mar. 26, 1991

[54] APPARATUS FOR ADJUSTING THE SHUT HEIGHT OF A MOLD IN A DIFFERENTIAL PRESSURE FORMING MACHINE

[75] Inventors: Gaylord W. Brown, Punta Gorda, Fla.; Timothy Dinnan, Sanford, Mich.

[73] Assignee: John Brown Inc., West Warwick, R.I.

[21] Appl. No.: 358,259

[22] Filed: May 30, 1989

[51] Int. Cl.⁵ .......................... B29C 51/18; B30B 1/16
[52] U.S. Cl. .................................... 425/398; 100/257;
425/182; 425/412; 425/451.7; 425/454;
425/DIG. 129
[58] Field of Search ............... 425/450.1, 451.2, 451.7,
425/451.9, 589, 590, 595, DIG. 129, 192 R, 193,
398, DIG. 221, 182, 406, 411, 412, 416, 423,
454; 100/257

[56] References Cited

U.S. PATENT DOCUMENTS

| Re. 27,137 | 6/1971 | Brown et al. | 425/388 |
| 3,327,353 | 6/1967 | Eggenberger | 425/451.7 |
| 3,677,675 | 7/1972 | Brown | 425/171 |
| 3,976,416 | 8/1976 | Hehl | 425/451.2 |
| 4,133,260 | 1/1979 | Gundal | 74/520 |
| 4,737,093 | 4/1988 | Hori et al. | 425/595 |

FOREIGN PATENT DOCUMENTS 923856 4/1982 U.S.S.R. .......................... 425/451.7

Primary Examiner—Jay H. Woo
Assistant Examiner—James P. Mackey
Attorney, Agent, or Firm—Burnett W. Norton

[57] ABSTRACT

Apparatus for vertically adjusting the position of a lower mold relative to an upper mold to control the shut height or spacing between the upper and lower molds when they are moved between vertically spaced apart, open positions, and closed positions engaging opposite sides of a thermoplastic sheet of material to form an object therein.

A plurality of toggle links are pivotally coupled to each other and to the mold and frame for determining the final position of the mold and the closed position.

The toggle link mechanism for the lower mold is mounted on the frame via a horizontally adjustable wedge mechanism which vertically adjusts another cooperating wedge mounting one pivotal end of the lower toggle links.

6 Claims, 2 Drawing Sheets

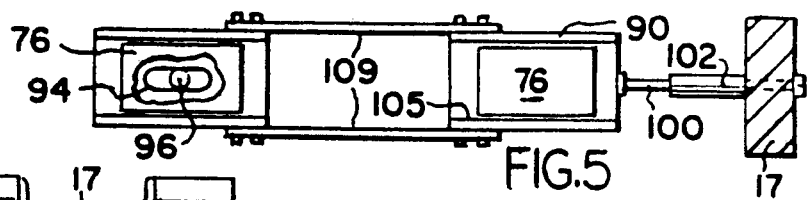
FIG. 5
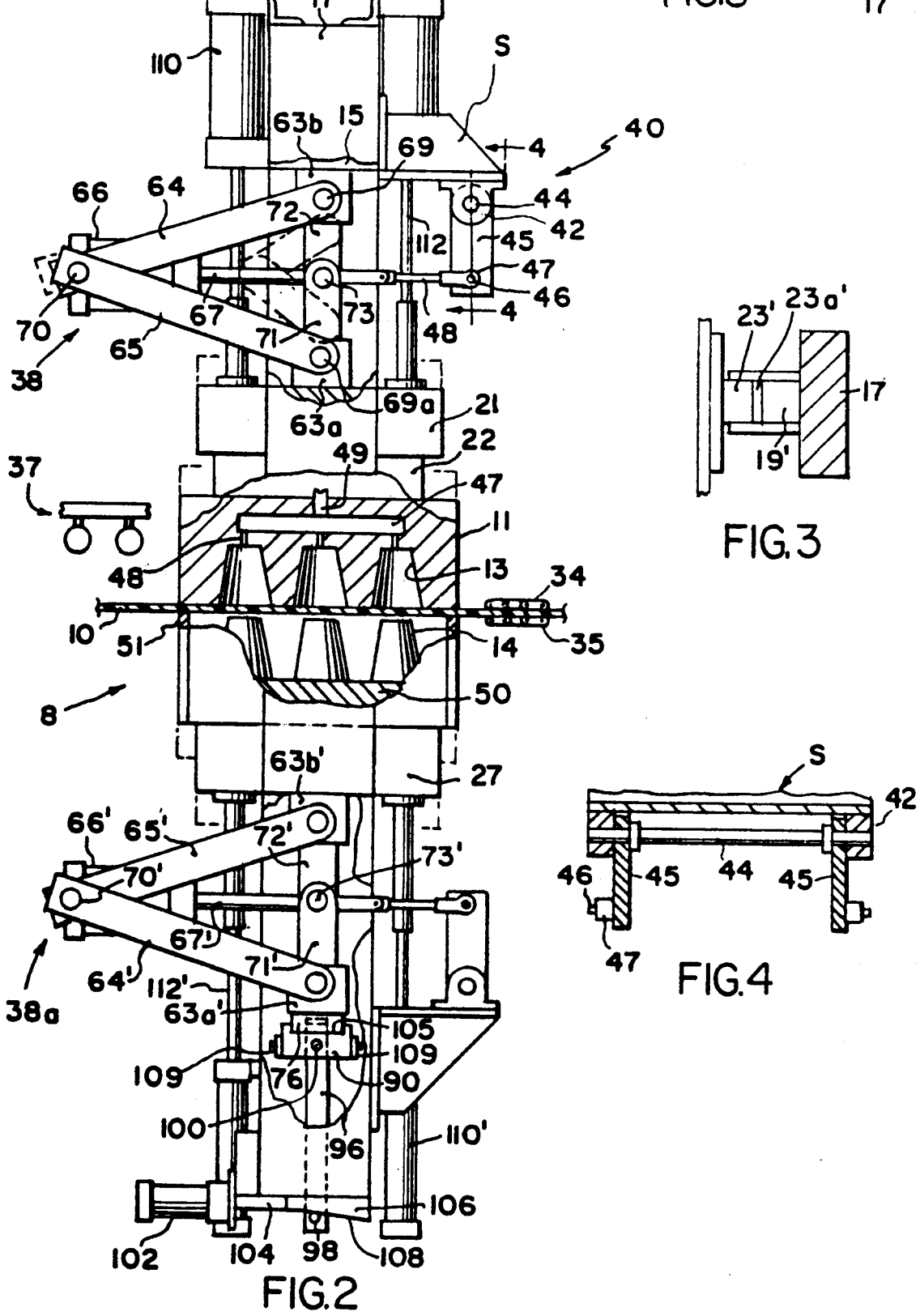
FIG. 3
FIG. 4
FIG. 2

APPARATUS FOR ADJUSTING THE SHUT HEIGHT OF A MOLD IN A DIFFERENTIAL PRESSURE FORMING MACHINE

BACKGROUND OF THE INVENTION

1. Field of the Invention

This invention relates to a machine, such as a differential pressure forming machine, having opposed die parts which are relatively movable between spaced apart positions and closed or "shut" positions for performing an operation, such as molding three dimensional articles in a sheet of thermoplastic material, and more particularly to adjustable eccentric mechanism for adjustably mounting the die parts in any selected one of a plurality of different positions to control the spacing between opposed die parts when the die parts are closed or "shut" while the machine is running.

2. Description of the Prior Art

Differential pressure forming machines, such as that disclosed in U.S. Pat. No. 3,346,923 issued to G. W. Brown, et al on Oct. 17, 1967, and U.S. Pat. No. 3,496,257 issued to G. W. Brown et al on Feb. 17, 1970, which are fully incorporated herein by reference as though recited word-for-word, include a pair of differential pressure molds which are vertically moved between spaced apart positions and closed adjacent positions abutting opposite sides of a thermoplastic sheet of material at a forming station to differential pressure form an object therein.

A thermoforming machine, such as that disclosed in U.S. Pat. No. 27,137 issued to G. W. Brown et al, on June 8, 1971, which is fully incorporated herein by reference a though recited word-for-word herein, also includes die parts which are mounted for movement between spaced apart positions and closed positions in engagement with opposite sides of a thermoplastic sheet to differentially pressure form three dimensional articles therein.

When the molds are moved to closed or "shut" molding positions, it is important that they be precisely positioned so as to be in sealing engagement with opposite sides of a heated sheet or web of thermoplastic material. The distance between the molds in the closed positions, is conventionally referred to as the "shut height". Due to varying thicknesses of sheets and also, because, after initial set-up, the molds frequently will be improperly set, when the molds close, they do not properly engage the sheet. Wear of moving parts will also sometimes vary the shut height after the machine has operated for a period of time. Thus, it is important that the shut height, distance or spacing between the molds in the closed molding positions be adjustable.

Such thermoforming machines typically include vertically movable upper and lower platens mounting upper and lower molds. Apparatus has been provided heretofore for vertically adjusting the position of the upper platen. One such prior art device included an adjustable eccentric mechanism for adjustably mounting the upper mold mounting platen. A thermoforming machine, such as that disclosed in U.S. Pat. No. 3,677,675 issued to Gaylord W. Brown on July 18, 1972, includes a differential pressure forming machine including apparatus for vertically moving the entire header which mounts the upper platen. Such prior art apparatus required that the machine be shut down including, disabling the heaters, prior to making the adjustments. Any such shut-down decreases operational efficiency and output of the machine.

Accordingly, it is an object of the present invention to provide new and novel apparatus for adjusting the shut height of a differential pressure thermoforming machine while the machine is operating.

It is another object of the present invention to provide new and novel apparatus for vertically adjusting the position of the lower platen in a differential pressure forming machine including upper and lower platens mounting upper and lower opposed molds.

It is yet another object of the present invention to provide new and novel apparatus for adjusting the shut height of a differential pressure forming machine while the machine is operating.

It is another object of the present invention to improve the operational efficiency of a differential pressure forming machine of the type described.

Still another object of the present invention is to provide a differential pressure forming machine including upper and lower mold members and mechanism for vertically adjusting the position of one of the mold members relative to the other mold members so that when the mold members are moved to closed positions, the mold members may be accurately and precisely positioned.

Apparatus, such as that disclosed in the referenced patents, includes pivotally coupled toggle links mounted between the frame and the mold mounting platens for locking the mold members in mold position in sealing engagement with the thermoplastic sheet of material.

Still another object of the present invention is to provide apparatus of the type described including shut height adjustment apparatus comprising cooperating wedge blocks which are relatively adjustable to control the position of the toggle links for the lower mold platen.

A still further object of the present invention is to provide apparatus of the type described including shut height adjustment mechanism having a wedge shaped, toggle link mounting block mounting a toggle link which locks the lower mold in the shut position and a cooperating wedge block for vertically adjusting the position of the toggle link mounting block.

It is another object of the present invention to provide a machine including die parts which move between spaced apart positions and closed positions engaging a sheet of thermoplastic material including cooperating wedge blocks which are laterally relatively adjustable to vertically adjust the machine.

Other objects and advantages of the present invention will become apparent to those of ordinary skill in the art as the description thereof proceeds.

SUMMARY OF THE INVENTION

A machine, such as a differential pressure forming machine, for performing an operation, such as molding articles, in a sheet of thermoplastic material comprising: a frame, a pair of opposed, vertically spaced, upper and lower die parts mounted on the frame for relative movement between removed positions, in which the die parts are spaced apart a predetermined distance, and closed positions, in which the die parts are spaced apart a lesser predetermined distance; and mechanism for relatively moving the die parts between the removed positions and the closed positions including linkage mechanism; pivot mechanism pivotally coupling the linkage mechanism to the frame and to at least the lower die part; the pivot mechanism being mounted on a wedge block which has a horizontally inclined wedging surface cooperating with a complementally formed wedging surface of a cooperating wedge block for selectively increasing or decreasing the lesser predetermined distance when the die parts are in the closed positions.

BRIEF DESCRIPTION OF THE DRAWINGS

The invention may be more readily understood by referring to the accompanying drawings, in which:

FIG. 2 is an end elevational view thereof, the toggle mechanism for loading the platens of the machine, the platen and molds being illustrated in chain lines, and part of the frame and parts of the molds being broken away to better illustrate the lower toggle links and the internal portions of the molds;

FIG. 3 is a sectional plan view taken along the line 3—3 of FIG. 1, more particularly illustrating one of the guides and rails for movably mounting the platen on the side frame rails;

FIG. 4 is a sectional end view, taken along the line 4—4 of FIG. 2, more particularly illustrating the stabilizer apparatus for coordinating movement of the piston rods; and FIG. 5 is a sectional plan view, taken along the line 5—5 of FIG. 1, more particularly illustrating the wedge mechanism which adjustably mounts the lower die assembly on the frame.

DESCRIPTION OF THE PREFERRED EMBODIMENT

Figure 1:
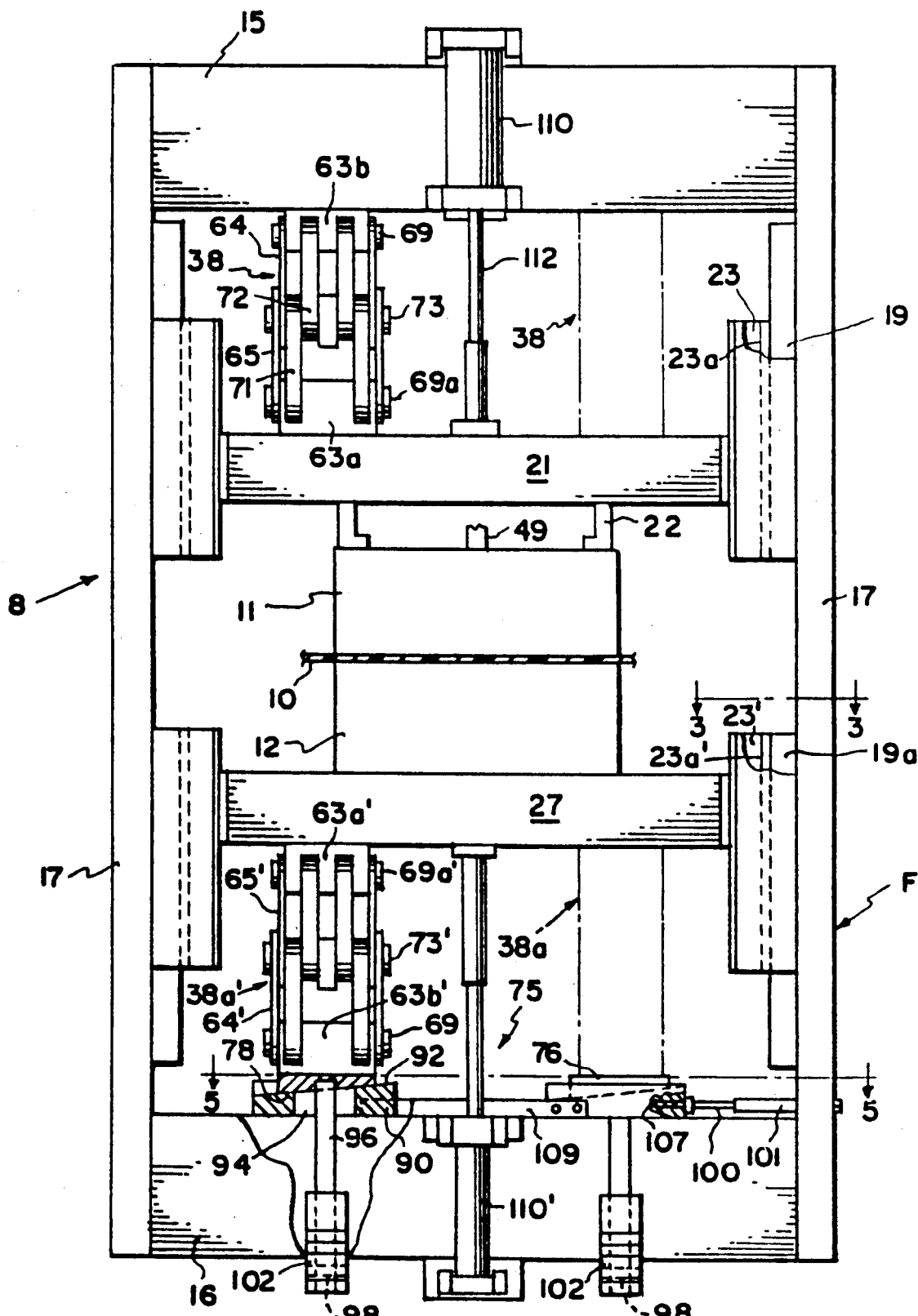
FIG. 1 is a front elevational view of a differential pressure forming machine constructed according to the present invention with the die boxes shown in confronting relation with a thermoplastic web, parts of the cooperating wedge blocks and frame being broken away in section.

Referring now more particularly to the accompanying drawing, a deep draw machine, generally designated 8, is provided for forming parts in a web 10 of suitable thermoplastic material, such as polystyrene. The machine 8, as illustrated in FIGS. 1 and 2, includes a female die box 11 and a male die box assembly, generally designated 12. The female die box assembly 11 includes spaced apart cavities 13 for forming three dimensional, truncated, cone-shaped, thin walled parts, such as drinking cups, in the plastic web 10. The male die box assembly 12 includes complementally shaped, spaced apart, plug assist members 14 in vertical axial alignment with the cavities 13. The cups, which are formed in the plastic web 10, are formed in inverted position and the formed web is then fed through a separate trim press which severs the cups from the web.

The frame of the forming machine, generally designated F, includes upper and lower header and base members 15 and 16, respectively, which are connected at both ends by vertical column members 17. Only the mold assembly portion of the machine is shown in the drawing but it is to be understood that the apparatus constructed according to the present invention is disposed within, and is a part of, an entire forming machine such as those disclosed in the aforementioned patents which are fully incorporated herein by reference. It is the function of the vertical column members 17 to support the female die box assembly 11 and the male die box assembly 12 for vertical travel.

Vertical rails 19 are mounted on the inner walls of the columns 17 to furnish guide surfaces for a vertically traveling upper platen 21 which carries the female die box assembly 11, angle members 22 supporting the assembly 11 on the platen 21, as shown. It will be seen that transversely extending, vertically disposed slides 23, including thrust plate 23a, on the platen 21, guide on the inner inside surfaces of the vertical guide rails 19 as illustrated, during vertical travel of the platen 21.

A pair of fluid pressure operated toggle link apparatus, generally designated 38, is provided for moving the upper platen 21 and upper mold box 11 to the lower, closed, forming position toward and away from the plastic web 10.

A lower platen 27 is also mounted for vertical travel on the guide rails 19a, there being vertical slides 23' and thrust plates 23a' which are received on lower vertical guide rails 19a.

Another pair of fluid pressure operated toggle link apparatus, generally designated 38a, is provided for moving the lower platen 27 and male die box assembly 12 between the lower position and a raised closed, forming position in engagement with the plastic web 10.

The plastic web 10 is fed intermittently between the upper and lower die assemblies 11 and 12 in the usual manner by pairs of superposed, nesting, upper and lower endless chains 34 and 35 which are described more particularly in U.S. Pat. No. 3,346,923 as well as in the U.S. Pat. No. 3,217,852, U.S. Pat. No. 3,677,675 U.S. Pat. Nos. 3,346,923, and U.S. Pat. No. 3,217,852 incorporated herein by reference. Heater, schematically designated 37, and more particularly described in U.S. Pat. No. 3,346,923 and U.S. Pat. No. 3,677,675, is provided for bringing the plastic web 10 to the forming temperature.

The upper die unit 11 may suitably include a vacuum manifold chamber 47 (FIG. 2) which connects a vacuum source 49 to the cavities 13 by means of passages 48.

The plug assist die box assembly 12 includes a member 50 mounting a plug assist member 14 in spaced relation with a surrounding clamp frame 51.

The upper and lower pairs of toggle mechanism, generally designated 38 and 38a respectively, move the upper and lower platens 21 and 27 and mold members 11 and 12 between the vertically spaced apart open positions, illustrated in chain lines in FIG. 2 and the closed forming positions, illustrated in solid lines in FIG. 2, and to maintain the molds 11 and 12 in tightly sealed relation with the plastic web 10 during the forming operation.

Mounted at one side of the platen 21 and connected to the header 15 and platen 21, each fluid pressure operated toggle mechanism 38 includes pairs of vertically spaced apart blocks 63a and 63b and it will be seen that pairs of links 64 and 65 at one side of the platen 21 connect the upper and lower blocks 63a and 63b, respectively, with the outer end of horizontally disposed fluid pressure operated cylinder 66 which has a piston rod 67. The blocks 63b are fixed to the header 15.

The relatively expandable and contractable links 64 and 65 are pivotally connected to the upper and lower blocks 63a and 63b, at each end of the platen 21, as with pins 69 and 69a, and are pivotally connected to the end of each cylinder 66 by a pin 70. The front end of each piston rod 67 is pivotally connected to the upper and lower blocks 63a and 63b by pairs of links 71 and 72. The links 71 and 72 are connected to the blocks 63a and 63b by the pins 69 and 69a and to the piston rod 67 in each case by a pin 73.

The pin 73 of each piston rod 67 is coupled to the other pin 73 of each piston rod 67 via a stabilizer, generally designated 40. The stabilizer 40 includes a pair of bearing blocks 42, mounted on a support member S fixed to the header 15, journaling a shaft 44 which dependently mounts two laterally spaced apart arms 45. Pins 46 mounted at the lower ends of arms 45 pivotally receive the eyes 47 of arms 48 that are coupled to the pins 73.

The stabilizer 40 insures that, in the event one cylinder 66 malfunctions, the piston rods 67 will uniformly move together so that the platen 21 does not tilt as it moves upwardly and downwardly.

Plainly, when fluid is supplied to one end of each of the cylinders 66, the platen 21 will be moved downwardly, and the links 64–65 and 71–72 are expanded, to the positions shown in solid lines, as illustrated in FIG. 2, to preload the system.

It will be noted that the cylinders 66' and associated linkage are utilized at the sides of the lower platen member 27 as well, except that the toggle mechanisms are inverted so that the blocks 63b' are uppermost. Accordingly, it will not be necessary to describe the toggle mechanisms for the lower platen 27 in detail. The identical parts are given the same reference characters except that primed numerals have been employed. The piston rods 67' of the cylinders 66' are actuated at the same time and function both to aid in raising the platen 27 and to preload the platen 27 in a direction toward the plastic web 10 and lock it in position. Inasmuch as the cylinders 66 and 66' are not in any way mounted on the frame of the machine, the preloading movement is not in anyway restricted.

When the fluid is concurrently admitted to one end of each of the cylinders 66 and 66', the piston rods 67 and 67' will retract to move toward the left in FIG. 2 and raise the upper platen 21 and lower the lower platen 27.

When fluid is supplied to the opposite ends the cylinders 66 and 66', it will expand the links 64–65 and 64'–65' from the generally coextensive positions, illustrated in chain lines in FIG. 2, to generally vertically aligned positions or "over center" positions to lock the mold in the positions illustrated in solid lines in FIG. 2.

The extended positions of the linkage assemblies 38 and 38a are indicated in the solid lines in FIG. 2 wherein the links 71 and 72 have reached the dead center positions. When the pistons 66 and 66' are fully actuated, the links 71 and 72 move substantially to dead center (vertical) position but never beyond it. The apparatus described heretofore, and the operation thereof, are conventional and is more particularly described in the aforementioned patents.

SHUT HEIGHT ADJUSTMENT APPARATUS

Apparatus, generally designated 75, for adjusting the shut height, is provided for adjustably mounting the lower platen 27 and lower mold 12 in any selected one of a plurality of different positions on the lower sill or base member 16 to control the spacing between the upper and lower molds 11 and 12 in the closed positions. The apparatus 75 includes a pair of upper toggle mounting blocks 76 having a horizontally inclined bottom wedging surfaces 78. Each toggle block 76 mounts one of the lower toggle link blocks 63b' having a horizontal pivot pin 69a'.

A pair of second wedge blocks, generally designated 90, is provided and each includes an oppositely inclined, upper wedging surface 92 complementally formed to the wedging surface 78. The wedging block 90 includes an elongated, vertical slot 94 therethrough which slidably receives a clamp bar 96 fixed to the upper block 76. The clamp bar 96 includes a transverse wedge pin 98 at the lower end thereof. The width of slot or aperture 94 is larger than the clamp bar 96 to allow the wedge block 90 to be moved horizontally relative to the upper toggle mounting block 76. A pair of side bars 109 couples the wedge blocks 90 to coordinate movement thereof.

A horizontally disposed, threaded, wedge block moving rod 100 is rotatably received by sleeve 101 fixed to one of the columns 17 and can be manually turned about its axis. As the rod 100 is manually turned about its axis, the threads 103 on rod 100 will turn into and out of the complementally threaded recess 107 in right hand wedge block 90 as illustrated in FIG. 1 to horizontally move the lower wedge blocks 90. This will force the upper toggle link mounting blocks 76 upwardly or downwardly depending on the direction of the movement of the lower wedge block 90. A pair of spaced apart guide bars are mounted atop the lower wedge block 90 to form a channel 105 for slidably receiving and laterally guiding on the upper mounting block 76.

The slot 94 in lower wedge block 90 is large enough to allow substantial lateral movement of the block 90 without putting side load stress on the upper toggle link block 76.

Apparatus is provided for selectively clamping the wedge blocks 76 and 90 in any one of a plurality of different positions to preclude inadvertent movement thereof after the proper adjustment is determined, and during operation, and includes a locking cylinder, generally designated 102, mounted on the lower sill 16, the cylinder 102 includes a piston rod 104 coupled to a third wedge bar 106 which has a horizontally inclined wedge surface 108 bearing against the wedge pin 98.

When the lower wedge blocks 90 are so positioned that the upper and lower molds 11 and 12, in the closed positions, are in sealing engagement with the thermoplastic sheet 10, the locking cylinder 102 is actuated to move the wedge bar 106 to the left, as illustrated in FIG. 2, to force the wedge pins 98 and upper wedge blocks 76 downwardly into tight, clamped relation with lower wedge blocks 90. If the shut height is to be later adjusted, the locking cylinder 102 is oppositely actuated to release the clamping pressure and move the wedge bar to the right so that the wedge blocks 76 and 90 can again relatively be moved.

A pair of fluid pressure operated balancing cylinders 110 is mounted on the header 15 and include piston rods 112 coupled to the platen 21 for balancing the weight of the mold and control the rate of movement. Similar balancing cylinders and stops are provided between the lower platen 27 and base 16 and are identified by similar reference characters followed by a prime designation.

THE OPERATION

When the machine is initially set up, the mold members 11 and 12, when in the closed positions illustrated in FIGS. 1 and 2, will sometimes not seal to the thermoplastic sheet 10. In such case, the locking cylinder 102 is actuated to move the clamping wedge bar 106 to the right as illustrated in FIG. 2 to release the clamping pressure holding upper wedge blocks 76 to the lower wedge blocks 90. The adjustment rod 100 is then turned about its axis to laterally move the lower wedge blocks 90 and thus vertically move the upper wedge blocks 76 and lower mold 12 relative to the upper mold 11 to obtain the desired spacing between the upper and lower molds 11 and 12.

When the wedge blocks 76, 90 are properly adjusted, the locking cylinder 102 is oppositely actuated to move the lock pins 98 downwardly and thus clamp the wedge blocks 76 and 90 tightly together to preclude further relative movement therebetween during continued operation of the machine. Fluid pressure will continue to be delivered to, and removed from, the fluid pressure operated cylinder 66 and 66' to alternately and oppositely move the upper and lower molds between the closed positions, illustrated in solid lines in FIG. 1, and the open positions, illustrated in chain lines in FIG. 1, after parts have been formed therein so that the sheet can be moved downstream and the formed parts removed.

If, during operation, it is desired to again adjust the shut height, the clamping cylinder 102 is again operated to move the wedge blocks 90 toward the right as illustrated in FIG. 1 to release the clamping pressure between the wedge blocks and allow the lower wedge blocks 90 to be moved relative to the upper wedge blocks 76. In performing the thermoforming operations, the machine operates in the manner of the machines described in the aforementioned patents which have been incorporated herein by reference, and no further explanation is considered necessary, inasmuch as the operation of such differential pressure and thermoforming machines is understood.

It is to be understood that the drawings and descriptive matter are in all cases to be interpreted as merely illustrative of the principles of the invention, rather than as limited the same in any way, since it is contemplated that various changes may be made in various elements to achieve like results without departing from the spirit of the invention or the scope of the appended claims.

What we claim is:

1. Apparatus for thermoforming an article in a thermoplastic sheet of material comprising:
   a frame;
   upper and lower opposed differential pressure mold means, mounted on said frame at a forming station for movement toward and away from each other between vertically spaced apart, open positions and closed positions, for engaging opposite sides of a thermoplastic sheet of material at a forming station;
   means for vertically moving said upper and lower mold means between said open and closed positions;
   means reacting between said frame and said lower mold means for locking said lower mold means in said closed position including;
     first toggle link means adapted to be pivotally mounted on said frame;
     second toggle link means pivotally mounted on said lower mold means; and
     means pivotally coupling said first and second toggle link means for swinging movement between collapsed, generally coextensive positions and extended, generally aligned positions;
   shut height adjustment means for vertically adjusting the position of said lower mold means relative to said upper mold means to control the height of the spacing between said upper and lower mold means in said closed positions comprising:
     first and second relatively movable wedge means for pivotally mounting said first toggle link means on said frame including
       first and second wedge blocks having oppositely horizontally inclined cooperating wedging surfaces;
       said first wedge block pivotally mounting said first toggle link means;
     means for horizontally moving one of said wedge blocks relative to the other of said wedge blocks to a plurality of different relative positions to vertically adjust the vertical position of said other of said wedge blocks and said first toggle link means while said upper and lower mold means are moving between said open and closed positions;
   wherein the improvement comprises
     means for selectively releasably clamping said first and second wedge blocks to said frame in any selected one of said plurality of different relative positions including third wedge means reacting between said frame and said first wedge block to selectively releasably urge said first wedge block toward said second wedge block and said frame.

2. The apparatus set forth in claim 1 wherein said second wedge block includes an aperture therethrough, said first wedge block includes a clamp rod member extending through said aperture;
   said third wedge means selectively bears against a distal portion of said clamp rod member.

3. The apparatus set forth in claim 2 including fluid pressure operated means for moving said third wedge means between clamping positions wherein said first wedge block is clamped to said second wedge block and a non-clamping position.

4. The apparatus set forth in claim 3 wherein said first wedge block is mounted above said second wedge block;
   each of said mold means comprising a differential pressure mold member and a platen mounting said mold member on said frame for vertical movement.

5. Apparatus for thermoforming an article in a thermoplastic sheet comprising:
   a frame;
   upper and lower cooperating mold means, mounted on said frame for vertical movement between vertically spaced, open positions and closed positions, for engaging opposite sides of a sheet of thermoplastic material at a forming station;
   means for moving said mold means between said open and closed positions;
   means for mounting said lower mold means on said frame including;
     first toggle link means having one end pivotally mounted on said frame;
     second toggle link means having one end pivotally mounted on said lower mold means;
     means pivotally coupling opposite ends of said first and second toggle link means together for movement between generally coextensive positions, when said lower mold means is in said open position, and generally aligned positions when said lower mold means is in said closed position; and
   shut height adjustment means for selectively adjusting the position of said lower mold means relative to said upper mold means while said mold means are moving between said open and closed positions to control the distance between said upper and lower mold means in said closed positions including means for vertically adjusting the location of one of said one ends of said first and second toggle link means relative to said frame;

said shut height adjustment means including a first wedge block pivotally mounting said one end of said first toggle link means; a second wedge block horizontally adjustably movably mounted on said frame; said first and second wedge blocks including cooperating, oppositely inclined abutting wedge surfaces bearing against each other;

said shut height adjustment means including means for horizontally relatively moving said first and second wedge blocks to a plurality of different relative positions for selectively releasably clamping said wedge blocks to said frame in any one of said plurality of different relative positions;

said second wedge block including an aperture therethrough;

wherein the improvement comprises:

a clamp bar mounted on said first wedge block extending through said aperture; and said clamping means including third wedge means bearing against said clamp bar and means for moving said third wedge means horizontally to releasably vertically clamp said clamp bar to said frame.

6. A differential pressure forming machine for molding articles in a sheet of thermoplastic material comprising:

a frame;

a pair of opposed upper and lower die parts mounted on said frame for relative movement between removed positions in which said die parts are spaced apart a predetermined distance and closed positions in which said die parts are spaced apart a lesser predetermined distance; and means for relatively moving said die parts between said removed positions and said closed positions including:

first and second links;

means pivotally coupling said links together;

a first connecting pin for pivotally coupling said first link to said frame; and a second connecting pin pivotally connecting said second link to one of said die parts;

wedge means for selectively increasing or decreasing said lesser predetermined distance when said die parts are in said closed positions including:

a first wedge block mounting said first connecting pin and having a first horizontally inclined bottom wedge surface;

a second wedge block disposed in lateral sliding engagement with said first wedge block and having a second oppositely horizontally inclined mating wedging surface bearing against and complementally formed to said bottom wedge surface; and means for horizontally relatively moving said first and second wedge blocks to a plurality of different relative horizontal positions;

wherein the improvement comprises means releasably clamping said first and second wedge blocks to said frame and in any selected one of said plurality of different positions to selectively increase or decrease said lesser predetermined distance including an aperture extending through said second wedge block;

a clamp bar mounted on said first wedge block and including a distal portion extending through said aperture; and third wedge means reacting between said frame and said distal portion of said clamp bar to selectively releasably urge said first wedge block toward said second wedge block and said frame.

* * * * *